United States Patent
Doshi

(10) Patent No.: US 8,036,264 B2
(45) Date of Patent: Oct. 11, 2011

(54) MEMORY MANAGEMENT IN VIDEO DECODING SYSTEMS

(75) Inventor: Sandeep Doshi, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 1509 days.

(21) Appl. No.: 11/419,886

(22) Filed: May 23, 2006

(65) Prior Publication Data

US 2007/0274391 A1 Nov. 29, 2007

(51) Int. Cl.
*H04N 7/12* (2006.01)
*H04N 11/02* (2006.01)
(52) U.S. Cl. ............... 375/240.01; 375/240.25
(58) Field of Classification Search . 375/240.01–240.29
See application file for complete search history.

(56) References Cited

U.S. PATENT DOCUMENTS

| | | | | |
|---|---|---|---|---|
| 5,973,742 A | * | 10/1999 | Gardyne et al. | 375/240.15 |
| 6,157,676 A | * | 12/2000 | Takaoka et al. | 375/240.13 |
| 6,690,835 B1 | * | 2/2004 | Brockmeyer et al. | 382/236 |
| 2004/0264570 A1 | * | 12/2004 | Kondo et al. | 375/240.16 |

* cited by examiner

*Primary Examiner* — David Czekaj
(74) *Attorney, Agent, or Firm* — Christopher P. Maiorama, PC

(57) ABSTRACT

A method for memory management in video decoding systems that avoids some of the costs and disadvantages with video decoding systems in the prior art. Some embodiments of the present invention are especially well-suited for use with the H.264 video decoding standard. The illustrative embodiment is a memory management technique that controls which data is in the fastest memory available to a processor performing video decoding. In particular, the technique seeks to ensure that the data the processor will need is in the primary memory and expunges data that the processor will not need. The technique is based upon an analysis of predictive video decoding standards, such as H.264. By employing this technique, the illustrative embodiment ensures the expedient decoding of video frames.

9 Claims, 17 Drawing Sheets

Figure 7

|  | p[x+7, y-1] |  |  |  |  |
|---|---|---|---|---|---|
|  | p[x+6, y-1] |  |  |  |  |
|  | p[x+5, y-1] |  |  |  |  |
|  | p[x+4, y-1] |  |  |  |  |
|  | p[x+3, y-1] | p[x+3, y] | p[x+3, y+1] | p[x+3, y+2] | p[x+3, y+3] |
|  | p[x+2, y-1] | p[x+2, y] | p[x+2, y+1] | p[x+2, y+2] | p[x+2, y+3] |
|  | p[x+1, y-1] | p[x+1, y] | p[x+1, y+1] | p[x+1, y+2] | p[x+1, y+3] |
|  | p[x, y-1] | p[x, y] | p[x, y+1] | p[x, y+2] | p[x, y+3] |
|  | p[x-1, y-1] | p[x-1, y] | p[x-1, y+1] | p[x-1, y+2] | p[x-1, y+3] |

Figure 10

| p[x-1, y-1] | p[x, y-1] | p[x+1, y-1] | p[x+2, y-1] | p[x+3, y-1] | p[x+4, y-1] |
| --- | --- | --- | --- | --- | --- |
| p[x-1, y] | p[x, y] | p[x+1, y] | p[x+2, y] | p[x+3, y] | p[x+4, y] |
| p[x-1, y+1] | p[x, y+1] | p[x+1, y+1] | p[x+2, y+1] | p[x+3, y+2] | p[x+4, y+2] |
| p[x-1, y+2] | p[x, y+2] | p[x+1, y+2] | p[x+2, y+2] | p[x+3, y+2] | p[x+4, y+2] |
| p[x-1, y+3] | p[x, y+3] | p[x+1, y+3] | p[x+2, y+3] | p[x+3, y+3] | p[x+4, y+3] |
| p[x-1, y+4] | p[x, y+4] | p[x+1, y+4] | p[x+2, y+4] | p[x+3, y+4] | p[x+4, y+4] |

Figure 11

```
// Video Decoding Method

// Initialize Border Pixels
p[-1, -1] = 0x80;
for (int i = 0; i <= 720; i++) p[i, -1] = 0x80;
for (int i = 0; i <= 480; i++) p[-1, i] = 0x80;

// Decode Macroblocks
for (int _macroblocks = 1; _macroblocks <= 1350; _macroblocks++)
{
    // Decode Luma Blocks
    for (int _luma = 1; _luma <= 16; _luma++)
    {
        retain pixel[x-1, y-1], pixel[x, y-1], pixel[x+1, y-1], pixel[x+2, y-1],
               pixel[x-1, y], pixel[x-1, y+1], pixel[x-1, y+1] in primary memory until
               pixel[x, y], pixel[x+1, y], pixel[x+2, y], pixel[x+3, y],
               pixel[x+1, y+1], pixel[x+2, y+1], pixel[x+3, y+1],
               pixel[x, y+2], pixel[x+1, y+2], pixel[x+2, y+2], pixel[x+3, y+2],
               pixel[x, y+3], pixel[x+1, y+3], pixel[x+2, y+3], and pixel[x+3, y+3] are established;
        retain pixel[x+3, y-1], pixel[x+3, y], pixel[x+3, y+1], pixel[x+4, y+1], pixel[x+4, y+2] in primary memory until
               pixel[x+4, y], pixel[x+4, y+1], pixel[x+4, y+2], and pixel[x+4, y+3] are established;
        retain pixel[x-1, y+3], pixel[x, y+3], pixel[x+1, y+3], and pixel[x+2, y+3] in primary memory until
               pixel[x, y+4], pixel[x+1, y+4], pixel[x+2, y+4], and pixel[x+3, y+4] are established;
        retain pixel[x+3, y+3] until pixel[x+4, y+4] is established;
        expunge pixel[x, y], pixel[x+1, y], pixel[x+2, y], pixel[x, y+1], pixel[x+1, y+1], pixel[x+2, y+1],
                pixel[x, y+2], pixel[x+1, y+2], and pixel[x+2, y+2] from primary memory before
                pixel[x+3, y], pixel[x+3, y+1], pixel[x+3, y+2], pixel[x, y+3], pixel[x+1, y+3],
                pixel[x+2, y+3], and pixel[x+3, y+3] are expunged from primary memory and before
                pixel[x+4, y], pixel[x+4, y+1], pixel[x+4, y+2], pixel[x+4, y+3], pixel[x, y+4],
                pixel[x+1, y+4], pixel[x+2, y+4], pixel[x+3, y+4], and pixel[x+4, y+4] are
    established;

wherein x  [x: x = 4n] and n  [n: n is a non-negative integer];
        wherein y  [y: y = 4m] and m  [m: m is a non-negative integer];
    }
}
```

MEMORY MANAGEMENT IN VIDEO DECODING SYSTEMS

FIELD OF THE INVENTION

The present invention relates to information technology in general, and, more particularly, to video decoding and memory management in video decoding systems.

BACKGROUND OF THE INVENTION

FIG. 1 depicts a video frame that comprises an image of a person in the prior art. The video frame comprises a two-dimensional array of 720 by 480 8-bit pixels. In some cases, all 345,600 pixels are transmitted when the frame is transmitted, but that requires that 345,600 bytes of data be transmitted for each frame.

There are techniques, however, for reducing, on average, the number of bytes that must be transmitted. One such technique is known as H.264. In accordance with H.264, some of the pixels in a frame are transmitted explicitly while others are not, but instead are derived or extrapolated from those that are.

To accomplish this, the pixels in the video frame are organized in a hierarchy of data structures. First, the frame is partitioned into a two-dimensional array of 45 by 30 macroblocks, as shown in FIG. 2. In turn, and as shown in FIG. 3, each macroblock is partitioned into a two-dimensional array of 4 by 4 luma blocks, and each luma block is partitioned into a two-dimensional array of 8-bit pixels.

All 1350 macroblocks in the frame are established in row-column order, as depicted in FIG. 4, so that each row is established, left to right, before the row before it is established. The 16 luma blocks within each macroblock are established in a specific pattern, as depicted in FIG. 5, to preserve the relationship that each luma block is established only after the luma blocks (if any) above it and to its left have been established. The reason is that the pixels in each luma block are either transmitted explicitly, or they are derived from the pixels in the luma blocks above it and to its left.

The pixels in a luma block are designated $p[x,y]$ through $p[x+3, y+3]$ as depicted in FIG. 6, wherein $x \in \{x: x=4n\}$ and $n \in \{n: n \text{ is a non-negative integer}\}$; and wherein $y \in \{y: y=4m\}$ and $m \in \{m: m \text{ is a non-negative integer}\}$ (i.e., the values of x and y are restricted to positive multiples of 4). When the pixels in a luma block are predicted based on the pixels above it and to its left, those pixels are designated $p[x-1, y-1]$ through $p[x+7, y-1]$ and $p[x-1,y]$ through $p[x-1,y+3]$, as depicted in FIG. 7. There are a variety of formulas for predicting the pixels in the luma block, as graphically depicted in FIGS. 8a through 8h, but the receiver is not able predict which formula will be used before it is told which formula to use.

This can wreak havoc on the speed with which the video frame can be decoded, and, therefore, the need exists for a technique for ensuring the expedient decoding of a video frame.

SUMMARY OF THE INVENTION

The present invention presents a method for memory management in video decoding systems that avoids some of the costs and disadvantages with video decoding systems in the prior art. Some embodiments of the present invention are especially well-suited for use with the H.264 video decoding standard.

The illustrative embodiment is a memory management technique that controls which data is in the fastest memory available to a processor performing video decoding. In particular, the technique seeks to ensure that the data the processor will need is in the primary memory and expunges data that the processor will not need. The technique is based upon an analysis of predictive video decoding standards, such as H.264. By employing this technique, the illustrative embodiment ensures the expedient decoding of video frames.

The illustrative embodiment comprises: retaining $pixel[x-1, y-1]$ in a first memory until $pixel[x, y]$ has been established; and expunging $pixel[x, y]$ from the first memory before $pixel[x+3, y+3]$ is expunged from the first memory; wherein $x \in \{x: x=4n\}$ and $n \in \{n: n \text{ is a non-negative integer}\}$; and wherein $y \in \{y: y=4m\}$ and $m \in \{m: m \text{ is a non-negative integer}\}$.

BRIEF DESCRIPTION OF THE DRAWINGS

FIG. 7 depicts the designation of the pixels in the luma block with regard to the pixels from which they can be derived.

FIG. 10 depicts the designation of the pixels in each luma block and the designation of the pixels that surround the luma block.

FIG. 11 depicts the pseudocode for controlling when pixels are retained in primary memory 911 and when pixels are expunged from primary memory.

DETAILED DESCRIPTION

Figure 1:
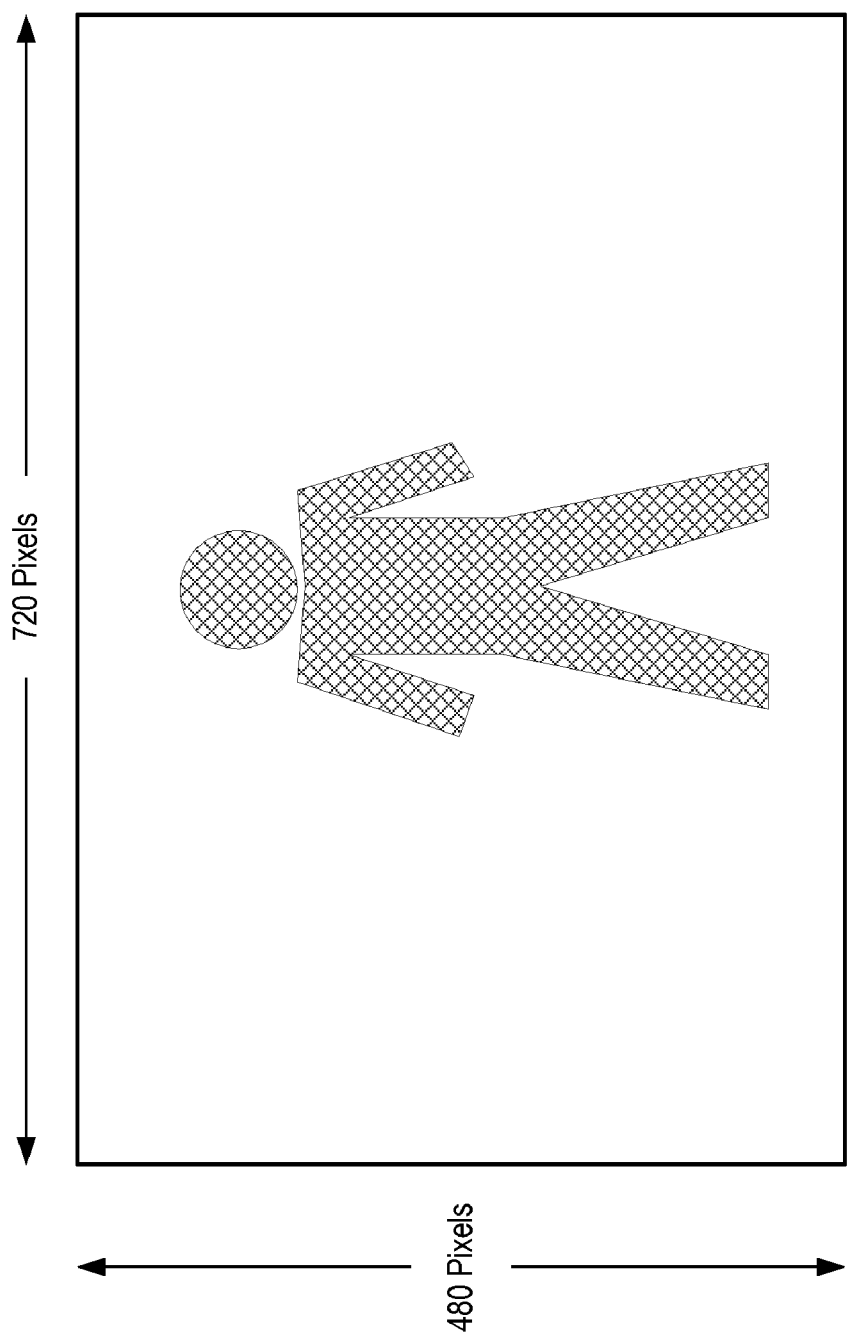
FIG. 1 depicts a video frame that comprises an image of a person in the prior art.
Figure 2:
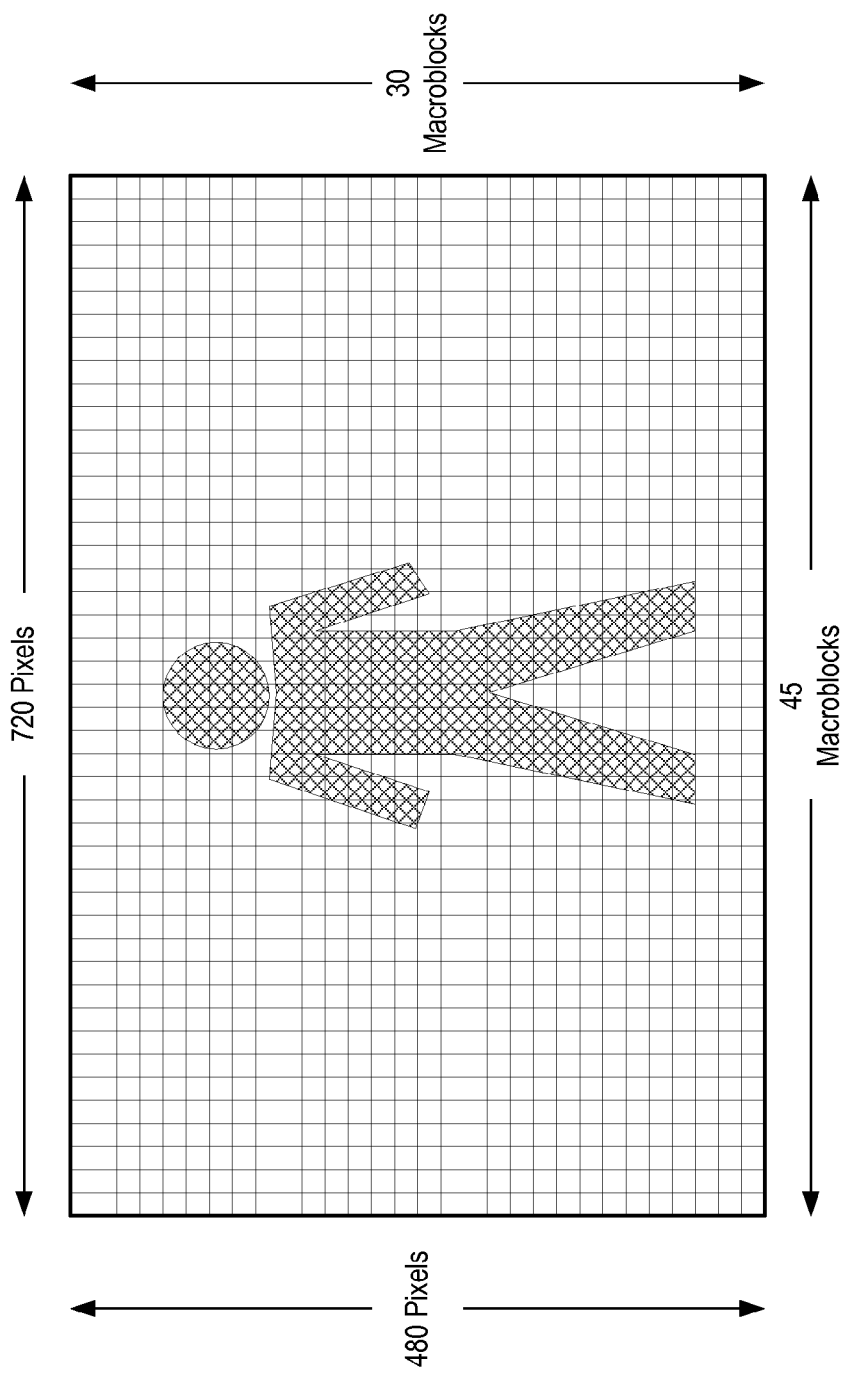
FIG. 2 depicts a video frame that is partitioned into a two-dimensional array of 45 by 30 macroblocks.
Figure 3:
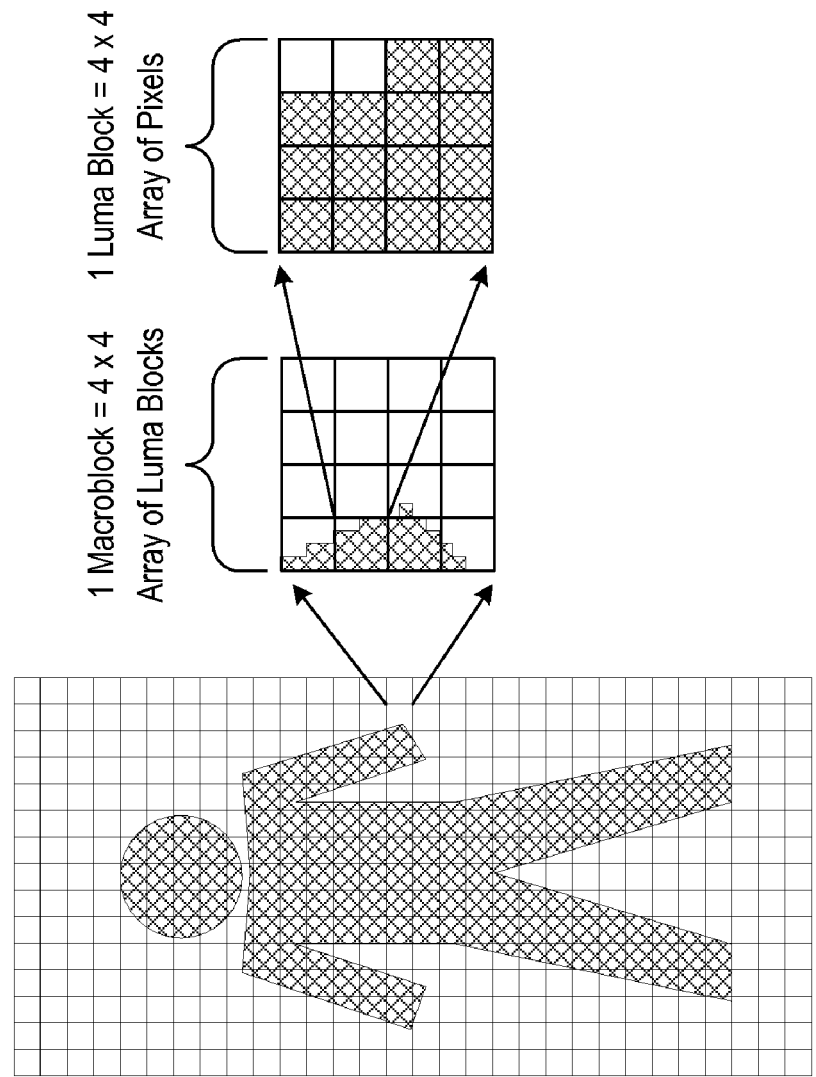
FIG. 3 depicts a macroblock as it is partitioned into luma blocks and pixels.
Figure 4:
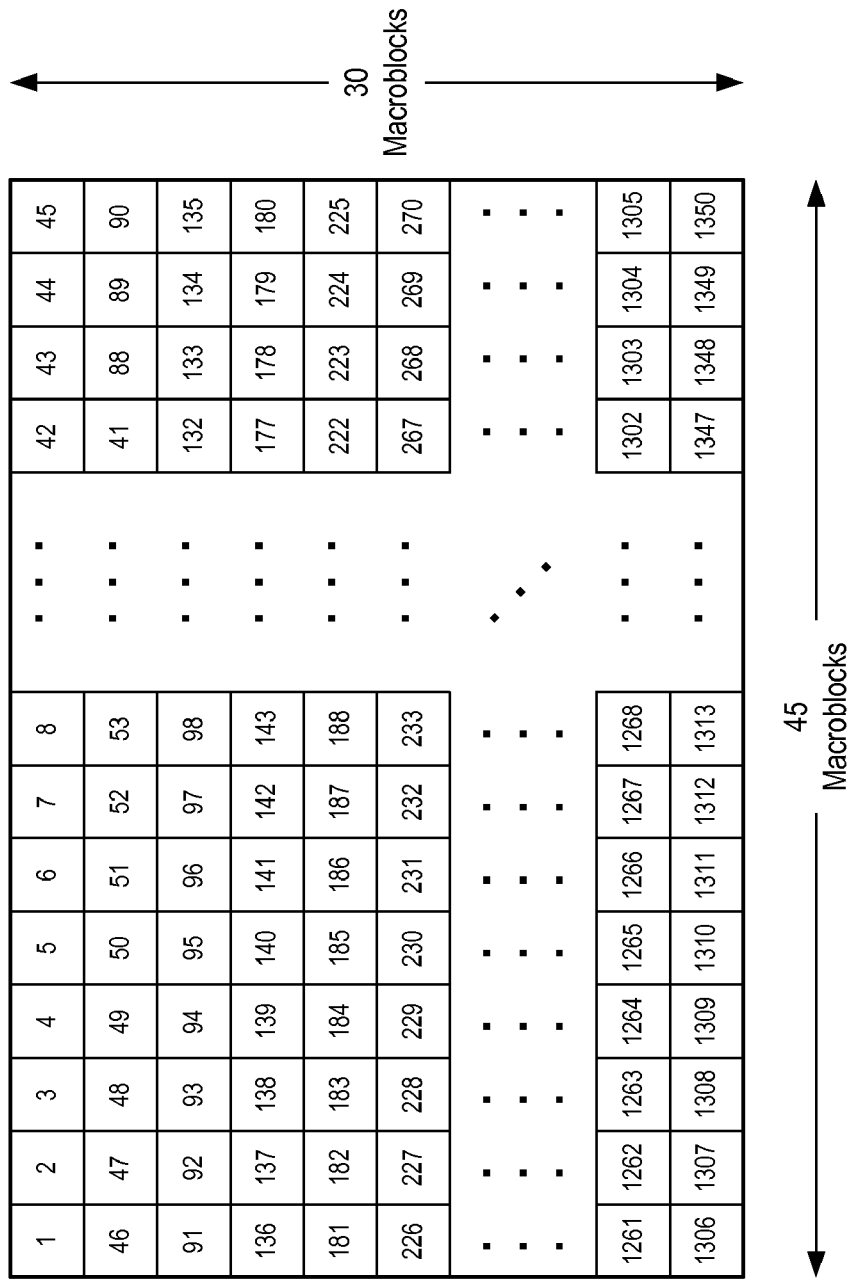
FIG. 4 depicts the order in which the macroblocks in a video frame are established.
Figures 5, 6:
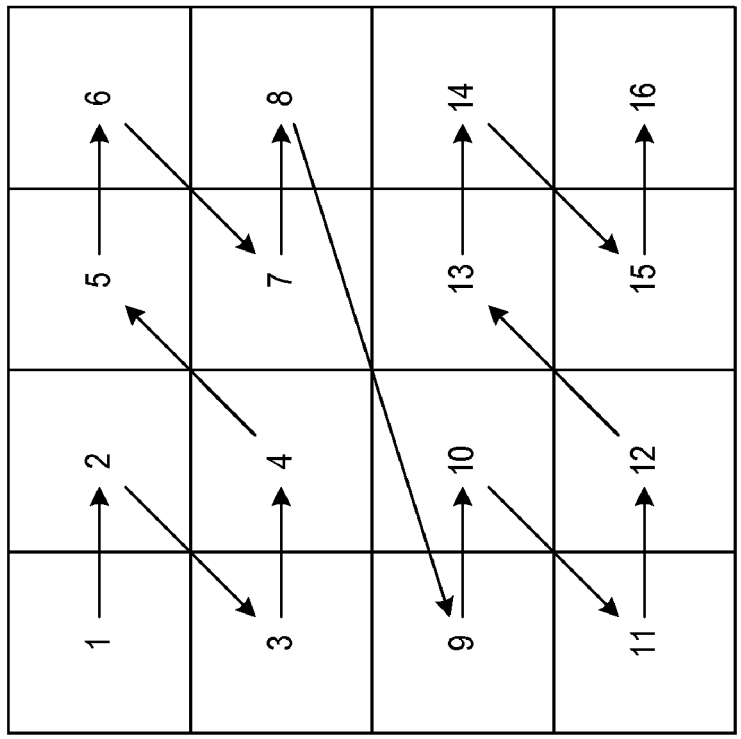
FIG. 5 depicts the order in which the luma blocks in a macroblock are established.
FIG. 6 depicts the designation of the pixels in a luma block.
Figure 8A:
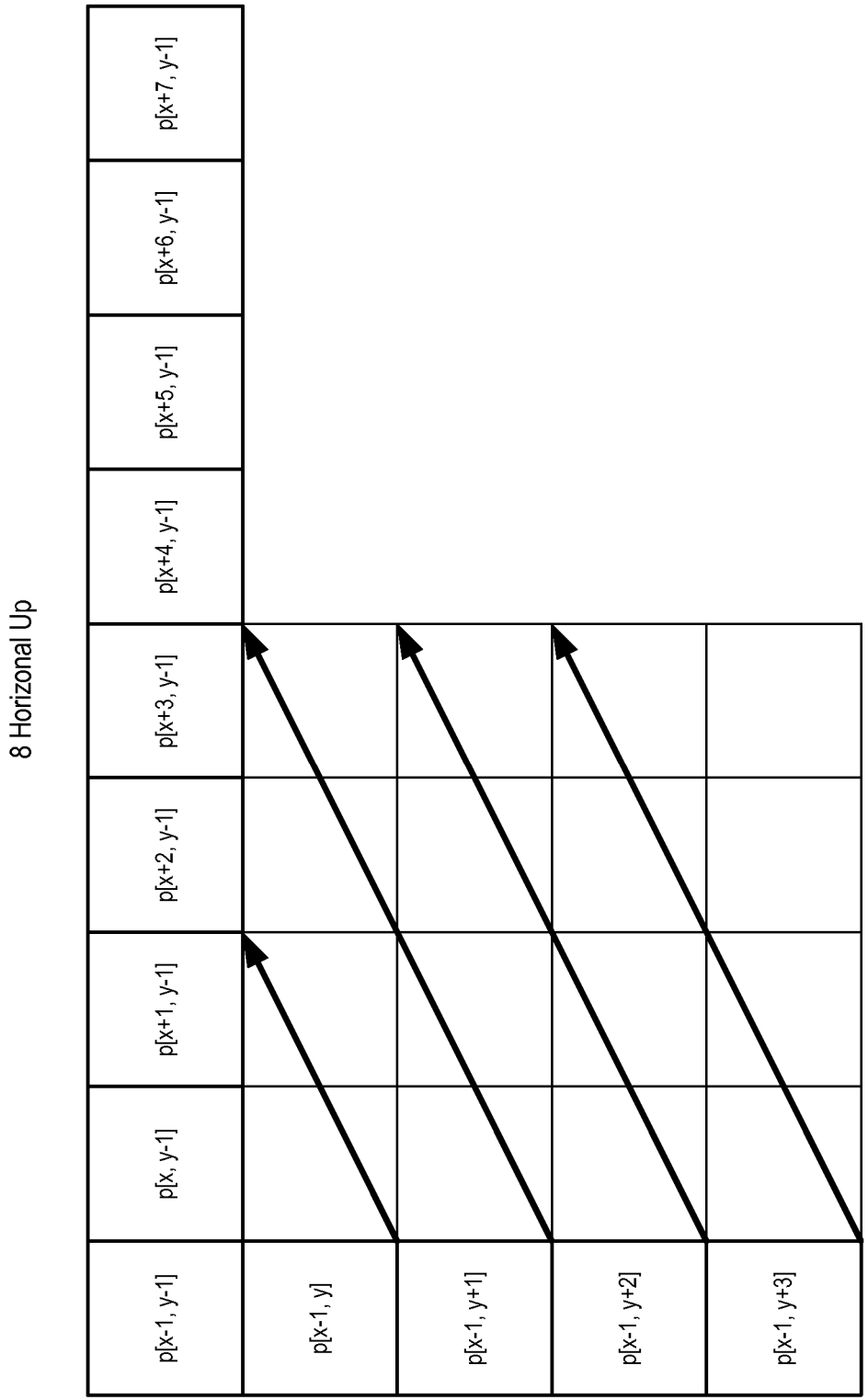
FIG. 8a depicts a graphical illustration of the H.264 Intra__4×4_Horizontal_Up prediction mode.
Figure 8B:
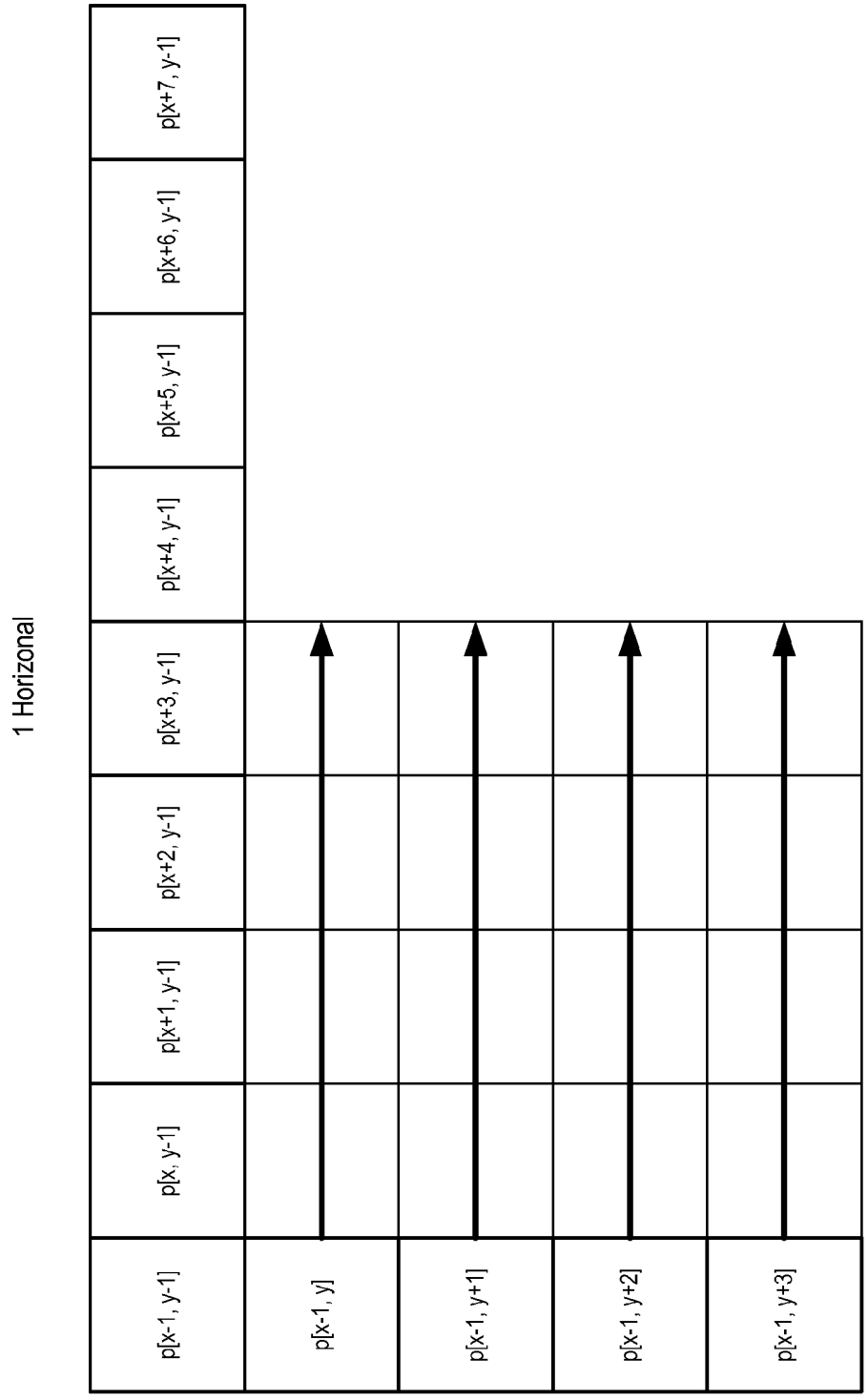
FIG. 8b depicts a graphical illustration of the H.264 Intra__4×4_Horizontal prediction mode.
Figure 8C:
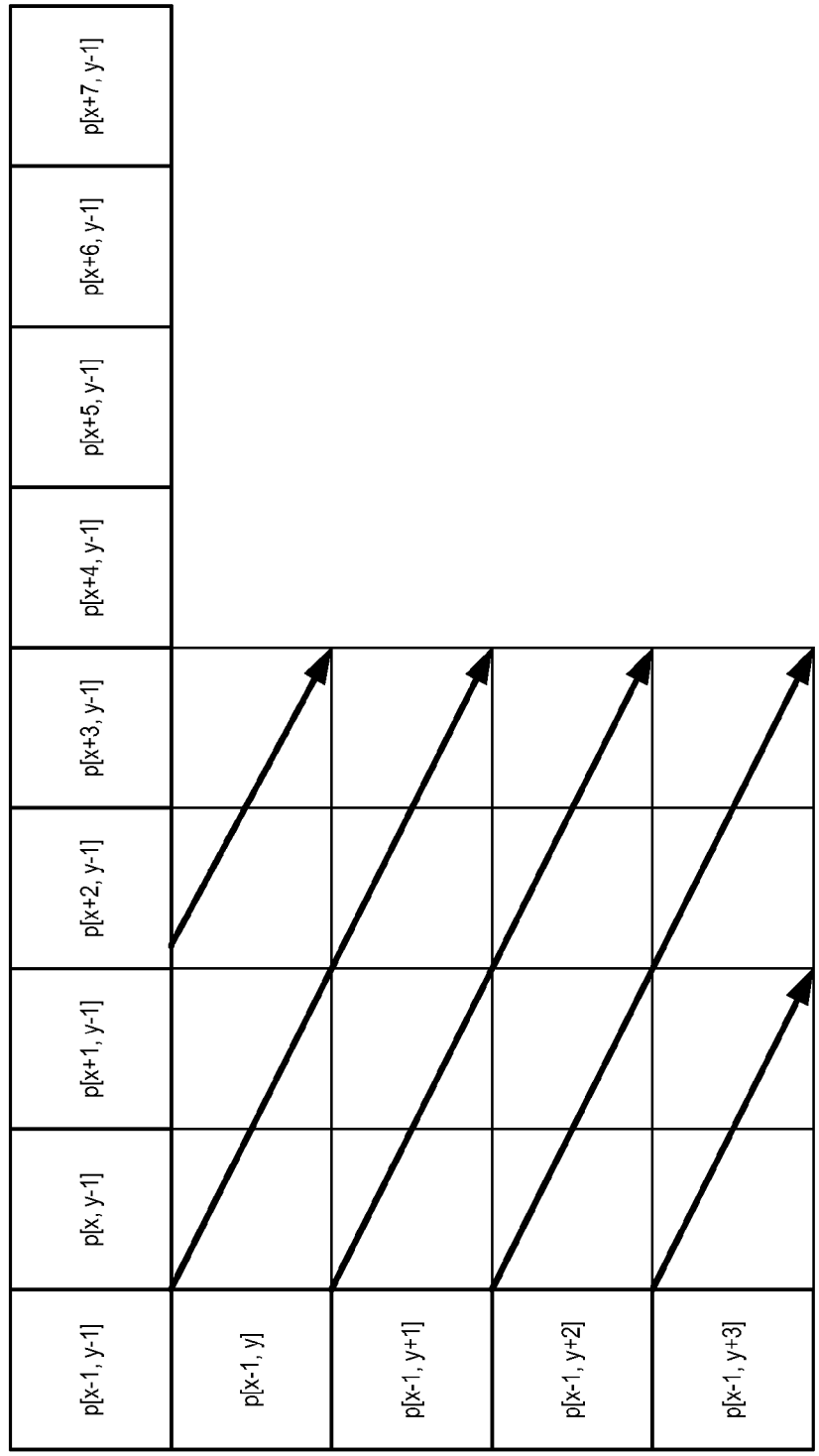
FIG. 8c depicts a graphical illustration of the H.264 Intra__4×4_Horizontal_Down prediction mode.
Figure 8D:
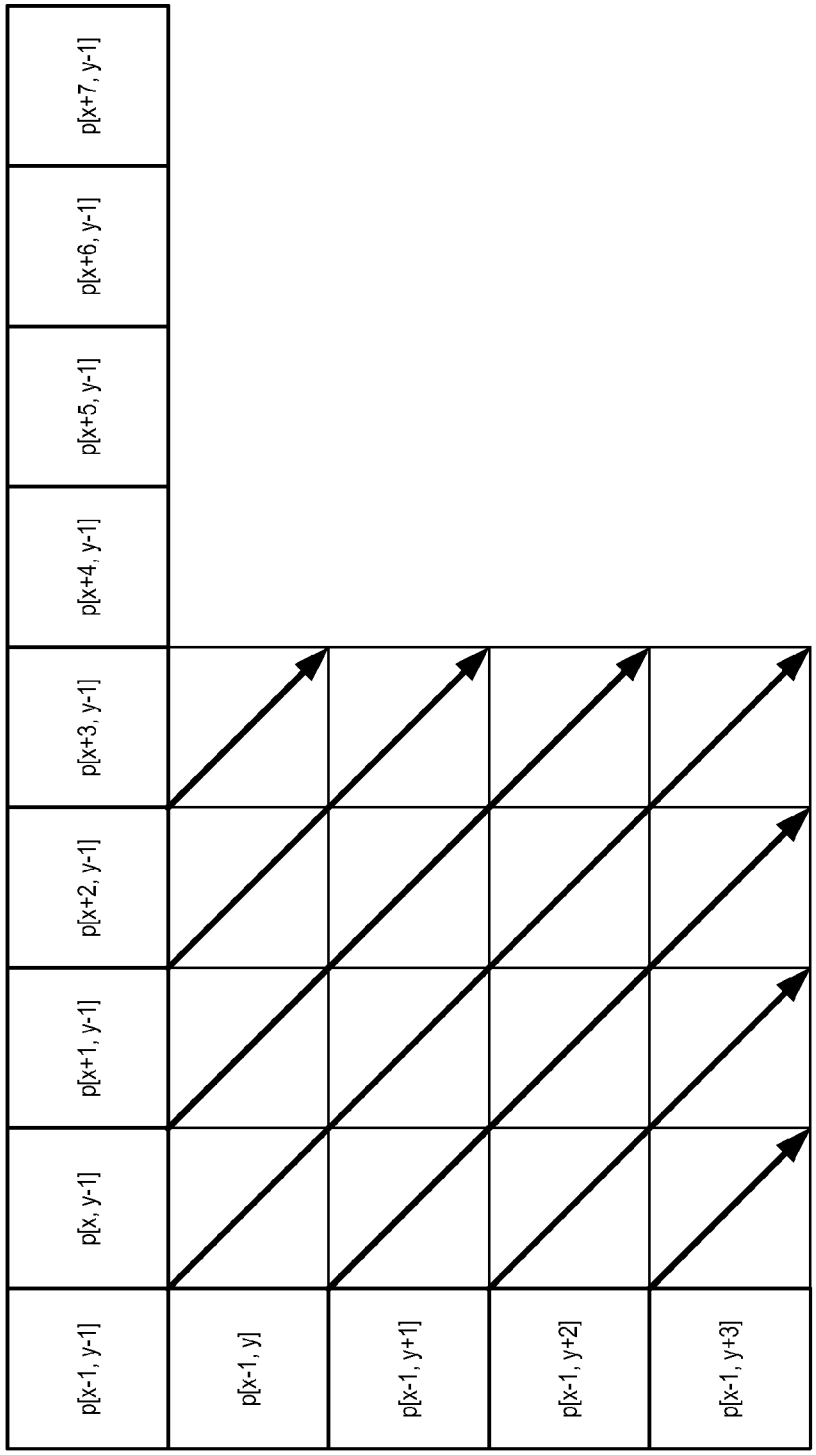
FIG. 8d depicts a graphical illustration of the H.264 Intra__4×4_Diagonal_Down_Right prediction mode.
Figure 8E:
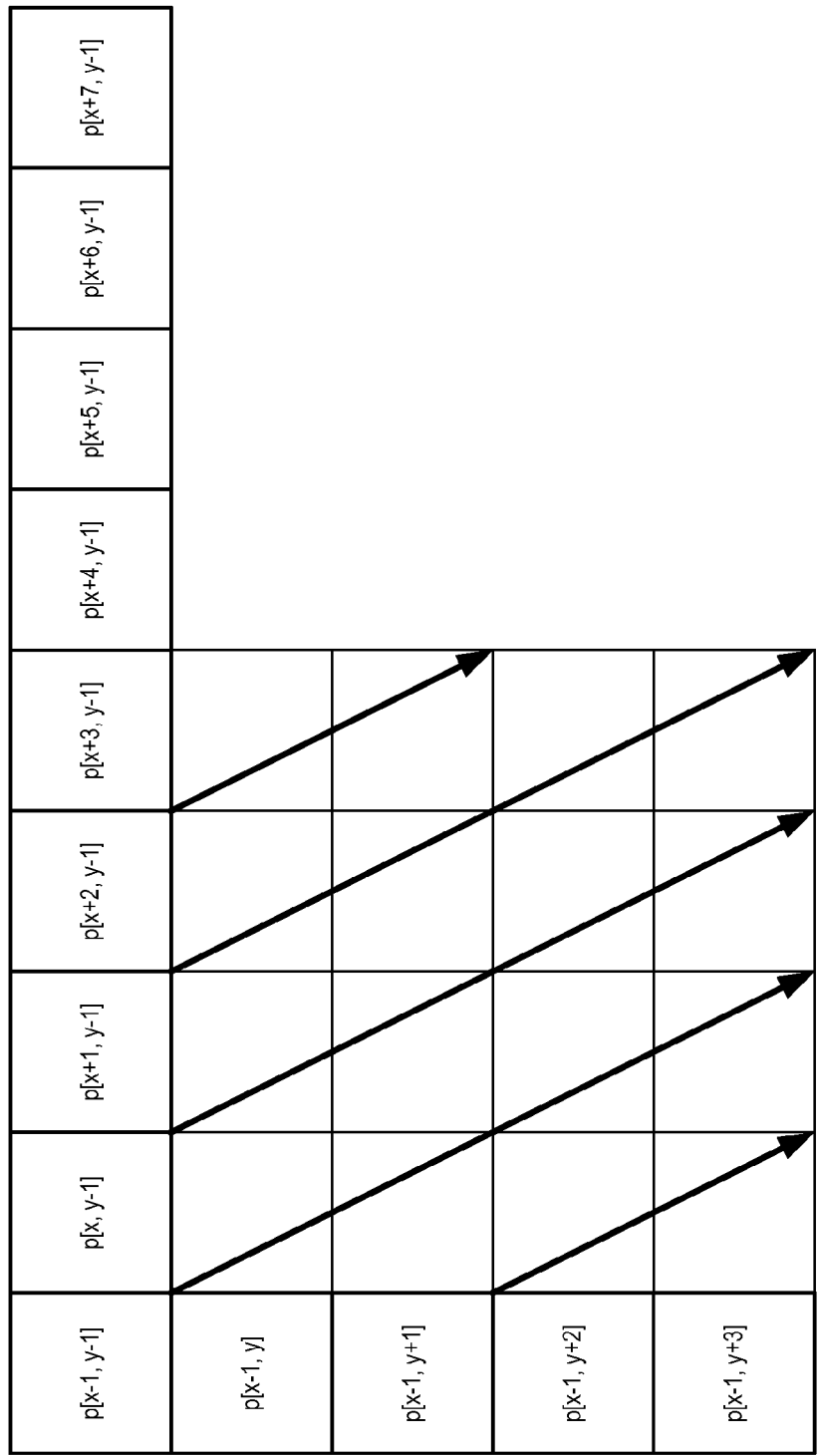
FIG. 8e depicts a graphical illustration of the H.264 Intra__4×4_Vertical_Right prediction mode.
Figure 8F:
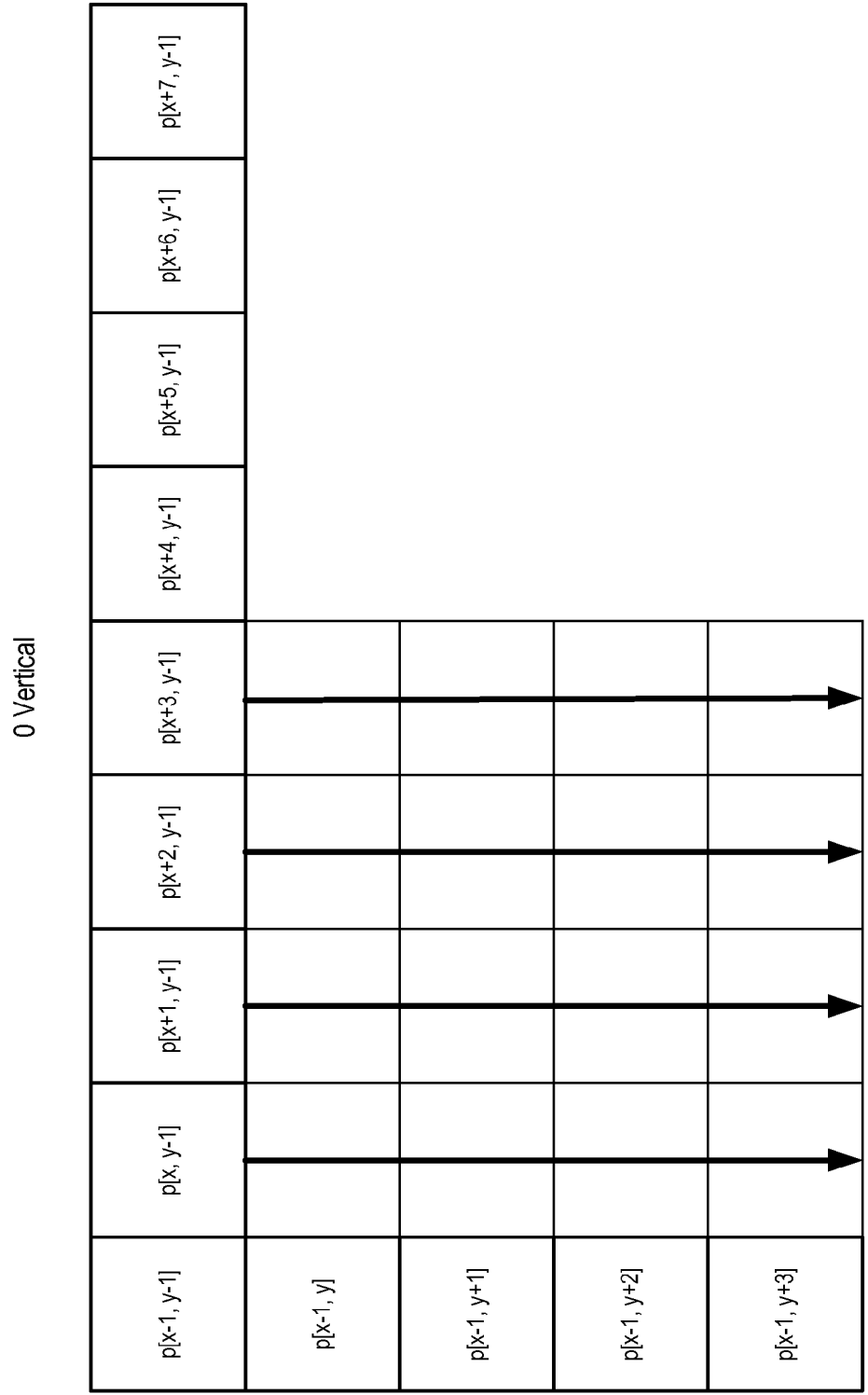
FIG. 8f depicts a graphical illustration of the H.264 Intra__4×4_Vertical prediction mode.
Figure 8G:
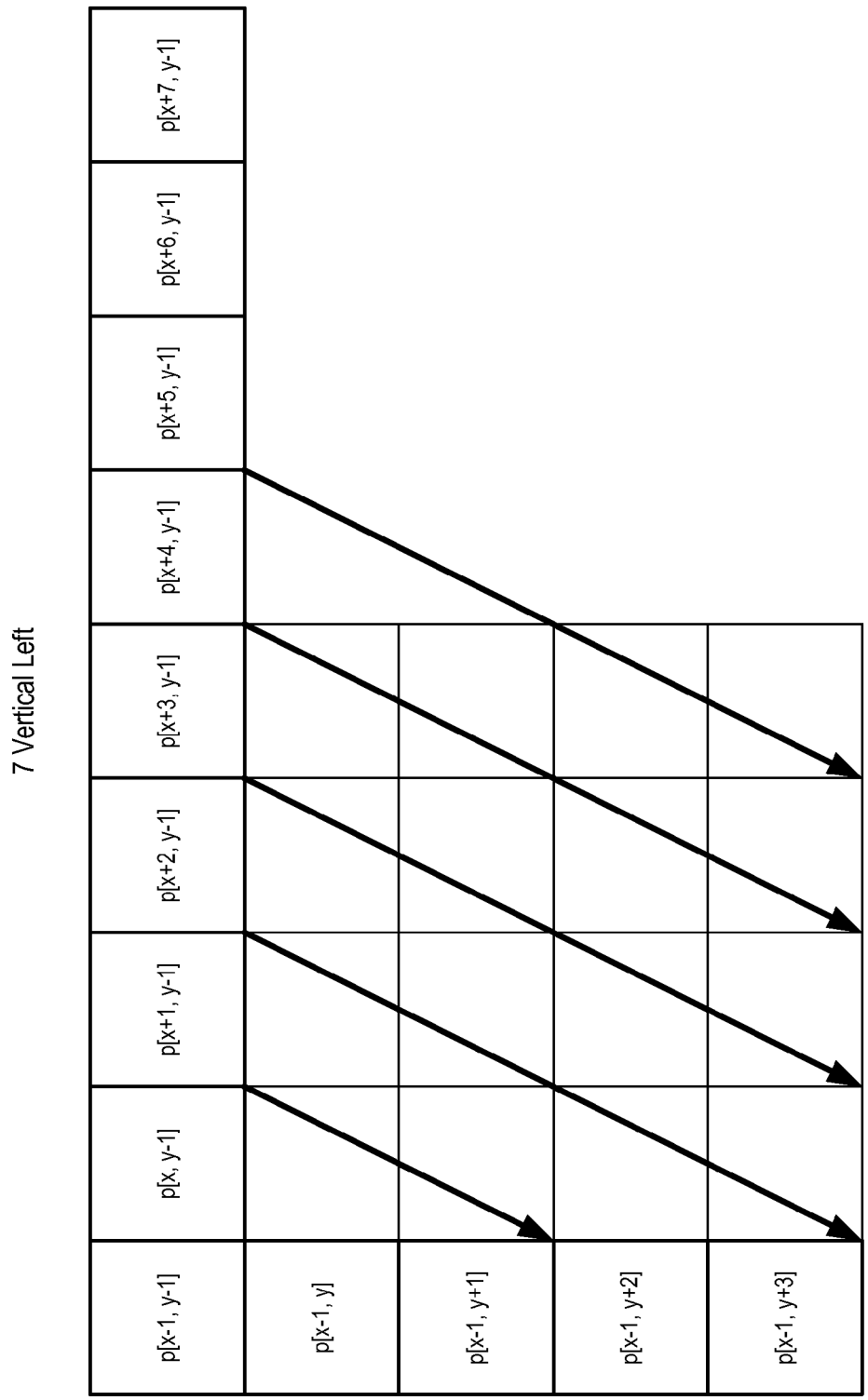
FIG. 8g depicts a graphical illustration of the H.264 Intra__4×4_Vertical_Left prediction mode.
Figure 8H:
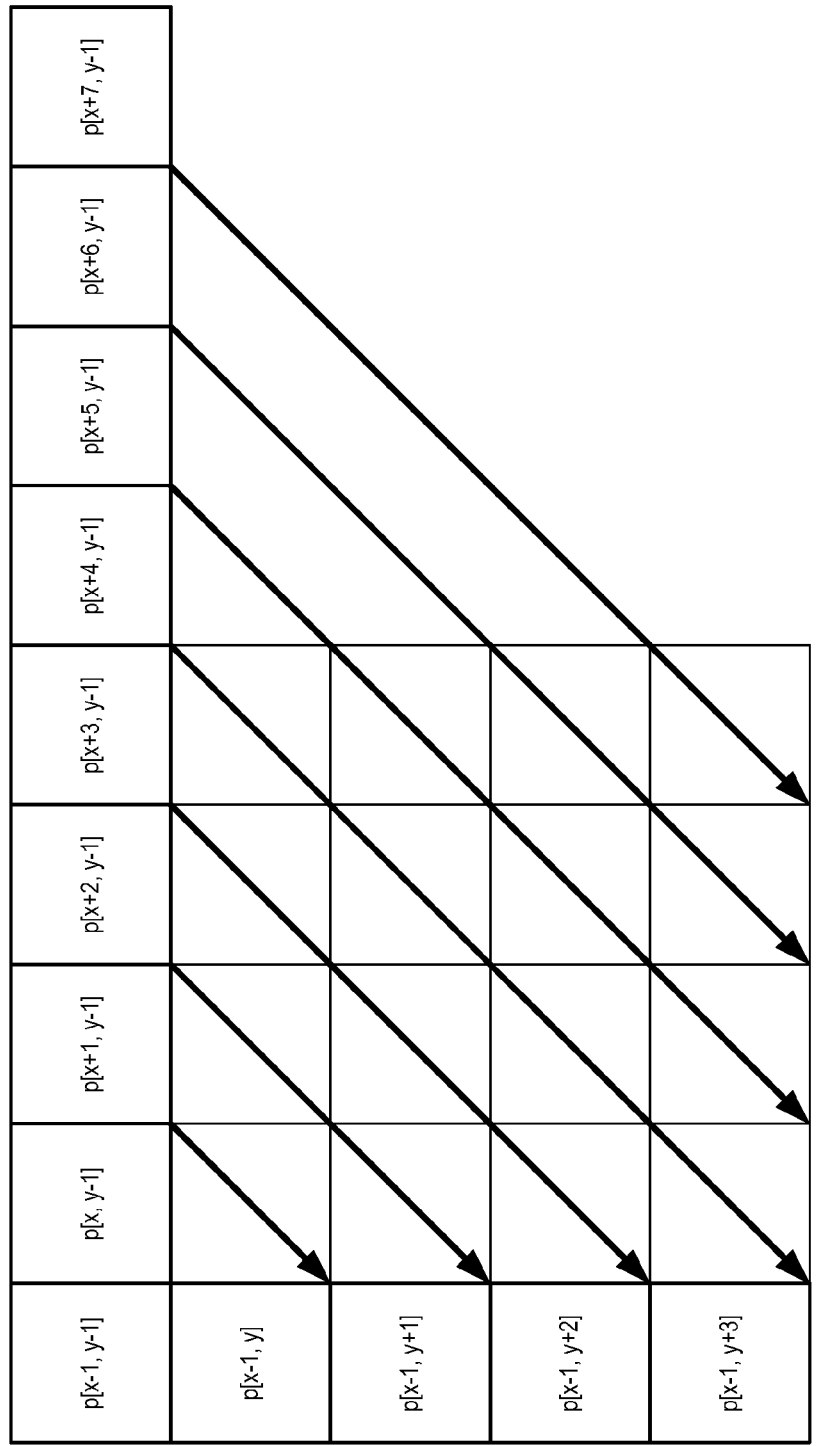
FIG. 8h depicts a graphical illustration of the H.264 Intra__4×4 Diagonal_Down_Left prediction mode.
Figure 9:
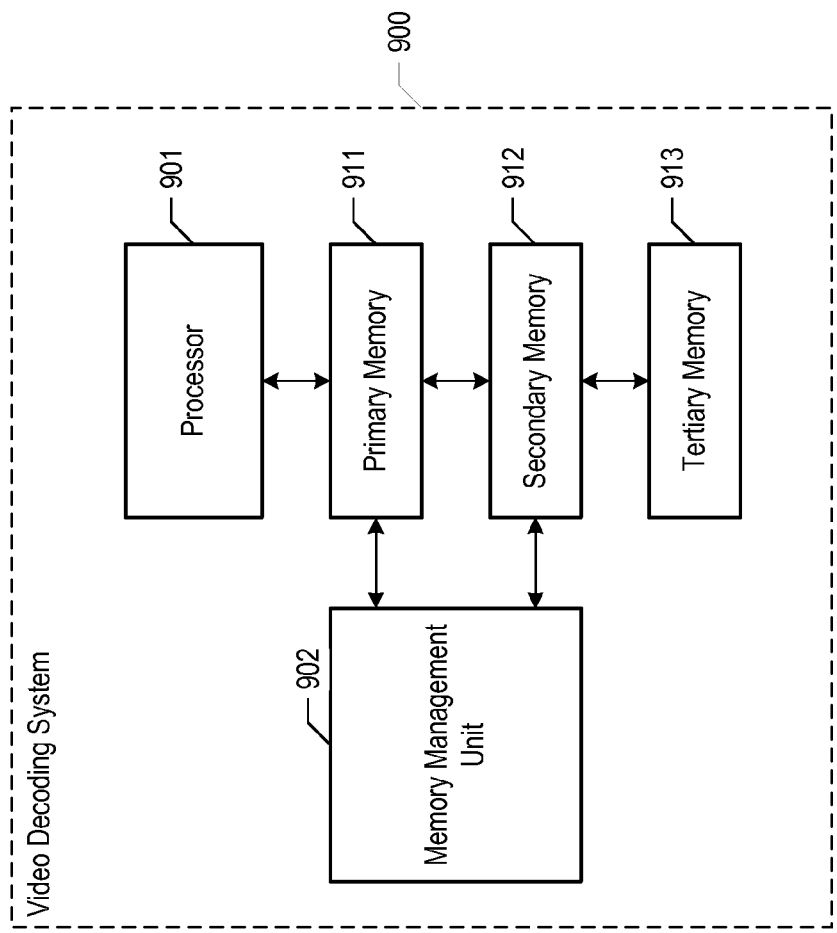
FIG. 9 depicts a block diagram of the salient components of the illustrative embodiment of the present invention, which is the architecture of a video decoding system.

FIG. 9 depicts a block diagram of the salient components of the illustrative embodiment of the present invention, which is the architecture of a video decoding system.

Video decoding system 900 comprises: processor 901, primary memory 911, secondary memory 912, tertiary memory 913, and memory management unit 902, interconnected as shown.

Processor 901 is a general-purpose processor that can read and write to primary memory 911 and that perform the functionality described herein.

Primary memory 911 is the fastest addressable memory and processor 901 can access data within primary memory 911 in one clock cycle. Primary memory 911 is not a content-addressable memory with a hardwired cache-retention discipline—or a cache that is invisible to the system programmer. In accordance with the illustrative embodiment, processor 901 and primary memory 911 are on the same monolithic die. In accordance with the illustrative embodiment, primary memory 911 has its own address space, which is distinct from the address space of secondary memory 912. It will be clear to those skilled in the art, however, how to make and use alternative embodiments of the present invention in which primary memory 911 and secondary memory 912 are in the same address space.

Secondary memory 912 is the second-fastest addressable memory in the system. Processor 901 can access data within secondary memory 912 in approximately 100 clock cycles. In accordance with the illustrative embodiment, secondary memory 912 is semiconductor memory but secondary memory 912 is not on the same die as processor 901. This accounts for the substantial difference in speed between secondary memory 912 and primary memory 911.

Tertiary memory 913 is the slowest addressable memory. Processor 901 can access data within tertiary memory 913 in approximately 10,000 clock cycles. In accordance with the illustrative embodiment, tertiary memory 913 is a mass storage device, such as a hard drive, and this accounts for the substantial difference in speed between tertiary memory 913 and secondary memory 912.

Primary memory 911 costs substantially more, per bit, than does secondary memory 912, and secondary memory 912 costs substantially more, per bit, than does tertiary memory 913. For this reason, primary memory 911 comprises substantially fewer bytes than secondary memory 912, and secondary memory 912 comprises substantially fewer bytes than tertiary memory 913.

When processor 901 seeks a word of data and the word is in primary memory 911, processor 901 can continue processing very quickly. In contrast, when processor 901 seeks a word of data and the word is not in primary memory 911, processor 901 waits until the word can be retrieved. Given that secondary memory 912 is $1/100^{th}$ of the speed of primary memory 911, processing can become very slow if processor 901 must regularly wait for data to be retrieved from secondary memory 912.

One solution is to ensure that the size of primary memory 911 is large because this reduces, probabilistically, the frequency with which a desired word is not in primary memory 911. This approach is problematic, however, because it is expensive and because some applications, such as video decoding, use such large quantities of data that any reasonably-sized primary memory would be ineffective.

To overcome this problem, the illustrative embodiment employs memory management unit 902 which controls what data is in primary memory 911 and what is not. In other words, memory management unit 902 retains in primary memory 911 data that will be needed by processor 901 soon and expunges from primary memory 911 data that will not be needed by processor 901 again soon. By retaining in primary memory 911 data that will be needed soon, the illustrative embodiment reduces the frequency and likelihood that processor 901 must wait until data can be retrieved from secondary memory 912, and by expunging from primary memory 911 data that will not be needed by processor 901 again soon, the illustrative embodiment frees up space in primary memory 911 for data that will be needed by processor 901 soon.

In many cases, a memory management unit cannot predict what data the processor will need again soon and what data it will not, but there are applications, such as video decoding, when reasonable predictions can be made.

FIG. 10 depicts the designation of the pixels in each luma block and the designation of the pixels that surround the luma block. At the beginning of the decoding of a video frame, none of the pixels are established. At the end of the decoding of the video frame, 345,600 pixels have been established by processor 901 and—at one time or another—stored within primary memory 911. All 345,600 8-bit pixels cannot be kept in primary memory 911 forever, and so, in accordance with the illustrative embodiment, each established pixel is expunged from primary memory 911 as soon as it is no longer needed. In principal, this sounds simple, but there are a lot of pixels and, without more, the overhead associated with determining which pixels are needed and for how long and when they can and should be expunged can create a computational and memory problem that is worse than the problem to be addressed. The illustrative embodiment, however, incorporates computationally simple rules that retain and expunge the pixels at times that make the maximum use of primary memory 911.

FIG. 11 depicts the pseudocode for controlling when pixels are retained in primary memory 911 and when pixels are expunged from primary memory. By following this procedure, memory management unit 902 ensures that pixels that will be needed soon by processor 901 are, in fact, in primary memory 911 and that pixels that will not be needed soon by processor 901 are expunged from primary memory 911.

As can be seen in FIG. 11, there are five (5) treatments for various groups of pixels. Each of the treatments comes from the relative position of the pixels and their potential use in predicting other pixels.

i. pixel[x−1, y−1], pixel[x, y−1], pixel[x+1, y−1], pixel[x+2, y−1], pixel[x−1, y], pixel[x−1, y+1], pixel[x−1, y+1] are retained in primary memory until pixel[x, y], pixel[x+1, y], pixel[x+2, y], pixel[x+3, y], pixel[x, y+1], pixel[x+1, y+1], pixel[x+2, y+1], pixel[x+3, y+1], pixel[x, y+2], pixel[x+1, y+2], pixel[x+2, y+2], pixel[x+3, y+2], pixel[x, y+3], pixel[x+1, y+3], pixel[x+2, y+3], and pixel[x+3, y+3] are established;

ii. pixel[x+3, y−1], pixel[x+3, y], pixel[x+3, y+1], and pixel[x+3, y+2] are retained in primary memory until pixel[x+4, y], pixel[x+4, y+1], pixel[x+4, y+2], and pixel[x+4, y+3] are established;

iii. pixel[x−1, y+3], pixel[x, y+3], pixel[x+1, y+3], and pixel[x+2, y+3] are retained in primary memory until pixel[x, y+4], pixel[x+1, y+4], pixel[x+2, y+4], and pixel[x+3, y+4] are established;

iv. pixel[x+3, y+3] is retained until pixel[x+4,y+4] is established; and v. pixel[x, y], pixel[x+1, y], pixel[x+2, y], pixel[x, y+1], pixel[x+1, y+1], pixel[x+2, y+1], pixel[x, y+2], pixel[x+1, y+2], and pixel[x+2, y+2] are expunged from primary memory before pixel[x+3, y], pixel[x+3, y+1], pixel[x+3, y+2], pixel[x, y+3], pixel[x+1, y+3], pixel[x+2, y+3], and pixel[x+3, y+3] are expunged from primary memory and before pixel[x+4, y], pixel[x+4, y+1], pixel[x+4, y+2], pixel[x+4, y+3], pixel[x, y+4], pixel[x+1, y+4], pixel[x+2, y+4], pixel[x+3, y+4], and pixel[x+4, y+4] are established.

It will be clear to those skilled in the art, after reading this specification, how to make and use embodiments of the present invention that retain and expunge pixels from primary memory 911.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method of decoding a video frame in a video decoding system comprising a primary memory and a secondary memory, said method comprising:

establishing pixel[x−1, y−1] in said primary memory;

retaining pixel[x−1, y−1] in said primary memory until pixel[x, y] has been established; and freeing up space in said primary memory by expunging pixel[x, y] from said primary memory before pixel[x+3, y+3] is expunged from said primary memory, wherein x and y are positive multiples of four, pixel[x−1, y−1], pixel[x, y−1], pixel[x+1, y−1], pixel[x+2, y−1], pixel[x−1, y], pixel[x−1, y+1], pixel[x−1, y+2] are retained in said primary memory until pixel[x, y], pixel[x+1, y], pixel[x+2, y], pixel[x+3, y], pixel[x, y+1], pixel[x+1, y+1], pixel[x+2, y+1], pixel[x+3, y+1], pixel[x, y+2], pixel[x+1, y+2], pixel[x+2, y+2], pixel[x+3, y+2], pixel[x, y+3], pixel[x+1, y+3], pixel[x+2, y+3], and pixel[x+3, y+3] are established, pixel[x+3, y−1], pixel[x+3, y], pixel[x+3, y+1], and pixel[x+3, y+2] are retained in said primary memory until pixel[x+4, y], pixel[x+4, y+1], pixel[x+4, y+2], and pixel[x+4, y+3] are established, pixel[x−1, y+3], pixel[x, y+3], pixel[x+1, y+3], and pixel[x+2, y+3] are retained in said primary memory until pixel[x, y+4], pixel[x+1, y+4], pixel[x+2, y+4], and pixel[x+3, y+4] are established, pixel[x+3, y+3] is retained until pixel[x+4, y+4] is established, and pixel[x, y], pixel[x+1, y], pixel[x+2, y], pixel[x, y+1], pixel[x+1, y+1], pixel[x+2, y+1], pixel[x, y+2], pixel[x+1, y+2], and pixel[x+2, y+2] are expunged from said primary memory before pixel[x+3, y], pixel[x+3, y+1], pixel[x+3, y+2], pixel[x, y+3], pixel[x+1, y+3], pixel[x+2, y+3], and pixel[x+3, y+3] are expunged from said primary memory and before pixel[x+4, y], pixel [x+4, y+1], pixel[x+4, y+2], pixel[x+4, y+3], pixel[x, y+4], pixel[x+1, y+4], pixel[x+2, y+4], pixel[x+3, y+4], and pixel[x+4, y+4] are established.

2. The method of claim 1, wherein each established pixel is expunged from said primary memory as soon as each established pixel is no longer needed.

3. The method of claim 1, wherein said primary memory comprises a fastest memory addressable by a processor of said video decoding system and said secondary memory comprises a second-fastest memory addressable by said processor.

4. The method of claim 3, wherein pixels that are not needed again soon by said processor are expunged from said primary memory and retained in said secondary memory.

5. The method of claim 3, wherein when said decoding of said video frame is completed, all pixels of said video frame have been established by said processor and each pixel was stored within said primary memory at one time or another.

6. A method of decoding a video frame in a video decoding system comprising a primary memory and a secondary memory, said method comprising:

establishing pixel[x−1, y] in said primary memory;

retaining pixel[x−1, y] in said primary memory until pixel[x, y] has been established; and freeing up space in said primary memory by expunging pixel[x, y] from said primary memory before pixel[x+3, y] is expunged from said primary memory, wherein x and y are positive multiples of four, pixel[x−1, y−1], pixel[x, y−1], pixel[x+1, y−1], pixel[x+2, y−1], pixel[x−1, y], pixel[x−1, y+1], pixel[x−1, y+2] are retained in said primary memory until pixel[x, y], pixel[x+1, y], pixel[x+2, y], pixel[x+3, y], pixel[x, y+1], pixel[x+1, y+1], pixel[x+2, y+1], pixel[x+3, y+1], pixel[x, y+2], pixel[x+1, y+2], pixel[x+2, y+2], pixel[x+3, y+2], pixel[x, y+3], pixel[x+1, y+3], pixel[x+2, y+3], and pixel[x+3, y+3] are established, pixel[x+3, y−1], pixel[x+3, y], pixel[x+3, y+1], and pixel[x+3, y+2] are retained in said primary memory until pixel[x+4, y], pixel[x+4, y+1], pixel[x+4, y+2], and pixel[x+4, y+3] are established, pixel[x−1, y+3], pixel[x, y+3], pixel[x+1, y+3], and pixel[x+2, y+3] are retained in said primary memory until pixel[x, y+4], pixel[x+1, y+4], pixel[x+2, y+4], and pixel[x+3, y+4] are established, pixel[x+3, y+3] is retained until pixel[x+4, y+4] is established, and pixel[x, y], pixel[x+1, y], pixel[x+2, y], pixel[x, y+1], pixel[x+1, y+1], pixel[x+2, y+1], pixel[x, y+2], pixel[x+1, y+2], and pixel[x+2, y+2] are expunged from said primary memory before pixel[x+3, y], pixel[x+3, y+1], pixel[x+3, y+2], pixel[x, y+3], pixel[x+1, y+3], pixel[x+2, y+3], and pixel[x+3, y+3] are expunged from said primary memory and before pixel[x+4, y], pixel[x+4, y+1], pixel[x+4, y+2], pixel[x+4, y+3], pixel[x, y+4], pixel[x+1, y+4], pixel[x+2, y+4], pixel[x+3, y+4], and pixel[x+4, y+4] are established.

7. A method of decoding a video frame in a video decoding system comprising a primary memory and a secondary memory, said method comprising:

establishing pixel[x, y−1] in said primary memory;

retaining pixel[x, y−1] in a primary memory until pixel[x, y] has been established; and freeing up space in said primary memory by expunging pixel[x, y] from said primary memory before pixel[x, y+3] is expunged from said primary memory, wherein x and y are positive multiples of four, pixel[x−1, y−1], pixel[x, y−1], pixel[x+1, y−1], pixel[x+2, y−1], pixel[x−1, y], pixel[x−1, y+1], pixel[x−1, y+2] are retained in said primary memory until pixel[x, y], pixel[x+1, y], pixel[x+2, y], pixel[x+3, y], pixel[x, y+1], pixel[x+1, y+1], pixel[x+2, y+1], pixel[x+3, y+1], pixel[x, y+2], pixel[x+1, y+2], pixel[x+2, y+2], pixel[x+3, y+2], pixel[x, y+3], pixel[x+1, y+3], pixel[x+2, y+3], and pixel[x+3, y+3] are established, pixel[x+3, y−1], pixel[x+3, y], pixel[x+3, y+1], and pixel[x+3, y+2] are retained in said primary memory until pixel[x+4, y], pixel[x+4, y+1], pixel[x+4, y+2], and pixel[x+4, y+3] are established, pixel[x−1, y+3], pixel[x, y+3], pixel[x+1, y+3], and pixel[x+2, y+3] are retained in said primary memory until pixel[x, y+4], pixel[x+1, y+4], pixel[x+2, y+4], and pixel[x+3, y+4] are established, pixel[x+3, y+3] is retained until pixel[x+4, y+4] is established, and pixel[x, y], pixel[x+1, y], pixel[x+2, y], pixel[x, y+1], pixel[x+1, y+1], pixel[x+2, y+1], pixel[x, y+2], pixel[x+1, y+2], and pixel[x+2, y+2] are expunged from said primary memory before pixel[x+3, y], pixel[x+3, y+1], pixel[x+3, y+2], pixel[x, y+3], pixel[x+1, y+3], pixel[x+2, y+3], and pixel[x+3, y+3] are expunged from said primary memory and before pixel[x+4, y], pixel[x+4, y+1], pixel[x+4, y+2], pixel[x+4, y+3], pixel[x, y+4], pixel[x+1, y+4], pixel[x+2, y+4], pixel[x+3, y+4], and pixel[x+4, y+4] are established.

8. A method of decoding a video frame in a video decoding system comprising a primary memory and a secondary memory, said method comprising:

establishing pixel[x, y−1], pixel[x+1, y−1], pixel[x+2, y−1], and pixel[x+3, y−1] in said primary memory;

retaining pixel[x, y−1], pixel[x+1, y−1], pixel[x+2, y−1], and pixel[x+3, y−1] in said primary memory until pixel[x, y], pixel[x+1, y], pixel[x+2, y], and pixel[x+3, y] are established; and freeing up space in said primary memory by expunging pixel[x, y], pixel[x+1, y], pixel[x+2, y], and pixel[x+3, y] from said primary memory before pixel[x, y+3], pixel[x+1, y+3], pixel[x+2, y+3], and pixel[x+3, y+3] are expunged from said primary memory, wherein x and y are positive multiples of four, pixel[x−1, y−1], pixel[x, y−1], pixel[x+1, y−1], pixel[x+2, y−1], pixel[x−1, y], pixel[−1, y+1], pixel[x−1, y+2] are retained in said primary memory until pixel[x, y], pixel[x+1, y], pixel[x+2, y], pixel[x+3, y], pixel[x, y+1], pixel[x+1, y+1], pixel[x+2, y+1], pixel[x+3, y+1], pixel[x, y+2], pixel[x+1, y+2], pixel[x+2, y+2], pixel[x+3, y+2], pixel[x, y+3], pixel[x+1, y+3], pixel[x+2, y+3], and pixel[x+3, y+3] are established, pixel[x+3, y−1], pixel[x+3, y], pixel[x+3, y+1], and pixel[x+3, y+2] are retained in said primary memory until pixel[x+4, y], pixel[x+4, y+1], pixel[x+4, y+2], and pixel[x+4, y+3] are established, pixel[x−1, y+3], pixel[x, y+3], pixel[x+1, y+3], and pixel[x+2, y+3] are retained in said primary memory until pixel[x, y+4], pixel[x+1, y+4], pixel[x+2, y+4], and pixel[x+3, y+4] are established, pixel[x+3, y+3] is retained until pixel[x+4, y+4] is established, and pixel[x, y], pixel[x+1, y], pixel[x+2, y], pixel [x, y+1], pixel[x+1, y+1], pixel[x+2, y+1], pixel[x, y+2], pixel[x+1, y+2], and pixel[x+2, y+2] are expunged from said primary memory before pixel[x+3, y], pixel[x+3, y+1], pixel[x+3, y+2], pixel[x, y+3], pixel[x+1, y+3], pixel[x+2, y+3], and pixel[x+3, y+3] are expunged from said primary memory and before pixel [x+4, y], pixel[x+4, y+1], pixel[x+4, y+2], pixel[x+4, y+3], pixel[x, y+4], pixel[x+1, y+4], pixel[x+2, y+4], pixel[x+3, y+4], and pixel[x+4, y+4] are established.

9. A method of decoding a video frame in a video decoding system comprising a primary memory and a secondary memory, said method comprising:

establishing pixel[x−1, y], pixel[x−1, y+1], pixel[x−1, y+2], and pixel[x−1, y+3] in said primary memory;

retaining pixel[x−1, y], pixel[x−1, y+1], pixel[x−1, y+2], and pixel [x−1, y+3] in said primary memory until pixel[x, y], pixel[x, y+1], pixel[x, y+2], and pixel[x, y+3] are established; and freeing up space in said primary memory by expunging pixel[x, y], pixel[x, y+1], and pixel[x, y+2] from said primary memory before pixel[x+3, y], pixel[x+3, y+1], pixel[x+3, y+2], and pixel[x+3, y+3] are expunged from said primary memory, wherein x and y are positive multiples of four, pixel[x−1, y−1], pixel[, y−1], pixel[x+1, y−1], pixel[x+2, y−1], pixel[x−1, y], pixel[x−1, y+1], pixel[x−1, y+2] are retained in said primary memory until pixel[x, y], pixel[x+1, y], pixel[x+2, y], pixel[x+3, y], pixel[x, y+1], pixel[x+1, y+1], pixel[x+2, y+1], pixel[x+3, y+1], pixel[x, y+2], pixel[x+1, y+2], pixel[x+2, y+2], pixel[x+3, y+2], pixel[x, y+3], pixel[x+1, y+3], pixel[x+2, y+3], and pixel[x+3, y+3] are established, pixel[x+3, y−1], pixel[x+3, y], pixel[x+3, y+1], and pixel[x+3, y+2] are retained in said primary memory until pixel[x+4, y], pixel[x+4, y+1], pixel[x+4, y+2], and pixel[x+4, y+3] are established, pixel[x−1, y+3], pixel[x, y+3], pixel[x+1, y+3], and pixel[x+2, y+3] are retained in said primary memory until pixel[x, y+4], pixel[x+1, y+4], pixel[x+2, y+4], and pixel[x+3, y+4] are established, pixel[x+3, y+3] is retained until pixel[x+4, y+4] is established, and pixel[x, y], pixel[x+1, y], pixel[x+2, y], pixel[x, y+1], pixel[x+1, y+1], pixel[x+2, y+1], pixel[x, y+2], pixel[x+1, y+2], and pixel[x+2, y+2] are expunged from said primary memory before pixel[x+3, y], pixel[x+3, y+1], pixel[x+3, y+2], pixel[x, y+3], pixel[x+1, y+3], pixel[x+2, y+3], and pixel[x+3, y+3] are expunged from said primary memory and before pixel[x+4, y], pixel[x+4, y+1], pixel[x+4, y+2], pixel[x+4, y+3], pixel[x, y+4], pixel[x+1, y+4], pixel[x+2, y+4], pixel[x+3, y+4], and pixel[x+4, y+4] are established.

\* \* \* \* \*